E. HELM.
BELT SHIFTER.
APPLICATION FILED JUNE 13, 1910.

1,005,207.

Patented Oct. 10, 1911.
2 SHEETS—SHEET 1.

Witnesses:

Inventor:
Ernst Helm

E. HELM.
BELT SHIFTER.
APPLICATION FILED JUNE 13, 1910.

1,005,207.

Patented Oct. 10, 1911.

2 SHEETS—SHEET 2.

Witnesses:

Inventor:
Ernst Helm

UNITED STATES PATENT OFFICE.

ERNST HELM, OF WEGELEBEN, GERMANY.

BELT-SHIFTER.

1,005,207. Specification of Letters Patent. Patented Oct. 10, 1911.

Application filed June 13, 1910. Serial No. 566,670.

*To all whom it may concern:*

Be it known that I, ERNST HELM, a subject of the King of Prussia, German Emperor, and resident of Wegeleben, Province of Saxony, Germany, have invented certain new and useful Improvements in Belt-Shifters, of which the following is a specification.

My invention relates to belt-shifting mechanism of the kind usually applied for this purpose to a set of loose and fast pulleys, and it is the object of the present invention to provide a belt-shifting mechanism for use with a driving pulley and an auxiliary pulley or the like connected with a stationary part and adapted to receive the belt.

For shifting the belt from the stationary pulley or the like, the mechanism is fitted with arms so disposed as to apply against the edges of the belt at the extreme crown portion of the pulley and shifts it away from the stationary pulley. By adopting the aforesaid mechanism various advantages are obtained of which the most essential advantage is that of an important saving in driving power by reason of the absence of friction from the idle pulley. This is especially a consideration in large installations. The stationary pulley or its equivalent, may have a straight or a concave periphery of slightly less diameter than the ordinary driving pulley. With this arrangement the belt does not stretch because it hangs loose on the stationary pulley. The belt lasts longer and the lubrication of an idle running pulley is saved. Furthermore, in case of accident in connection with the running belt, the latter can be instantly stopped.

My improved arrangement is shown in the accompanying drawings, in which:—

Figure 1:
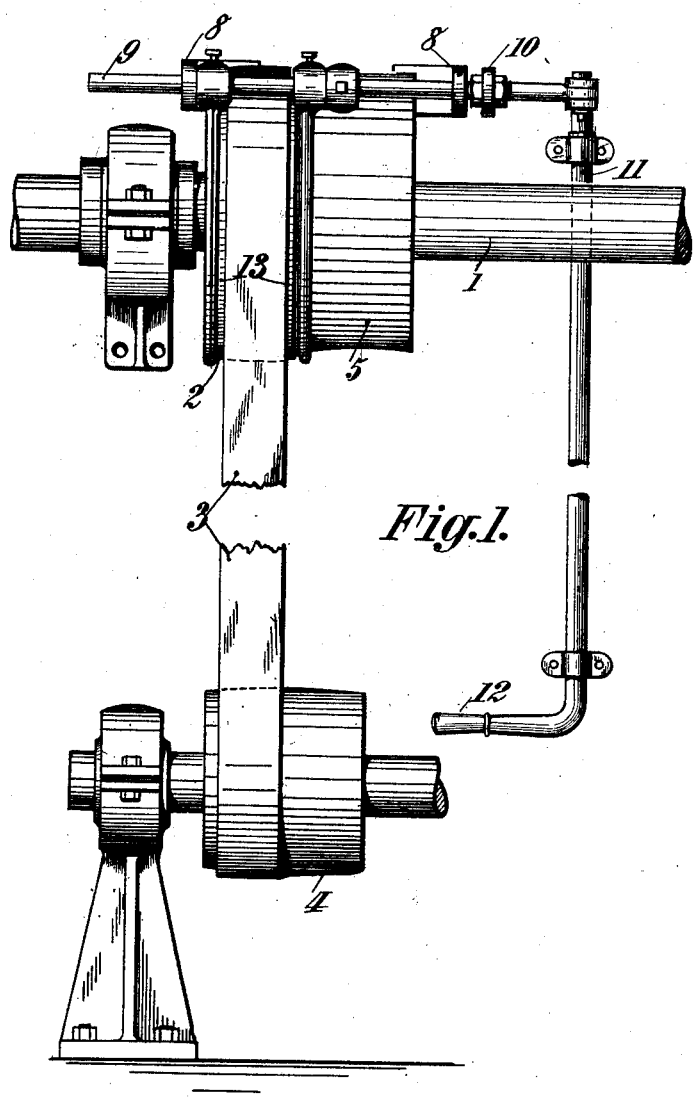
Figure 2:
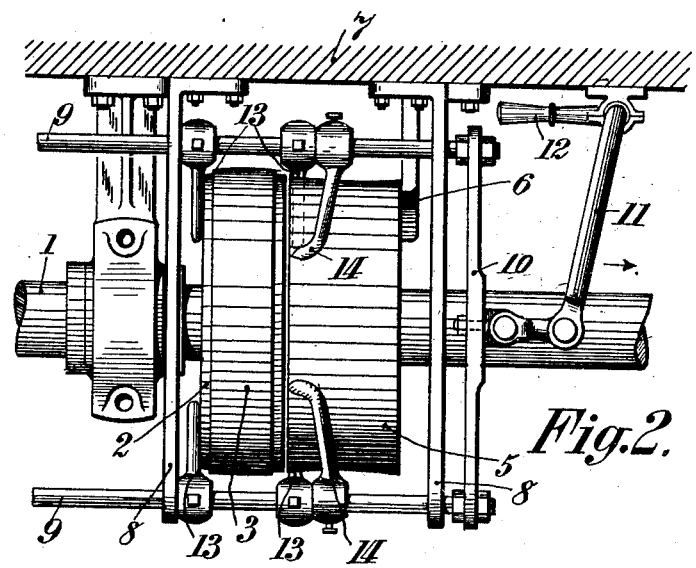
Figure 3:
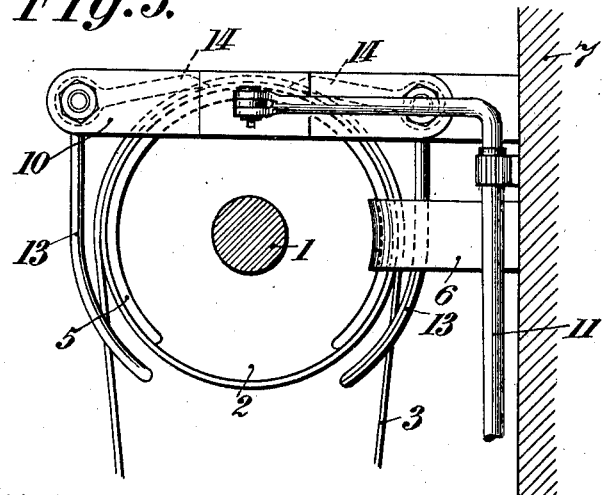

Figure 1 is a front-elevation. Fig. 2 is a plan, and Fig. 3 is a side-elevation.

On the shaft 1 is fixed an ordinary driving pulley 2 which by means of belt 3 rotates the pulley 4 of a machine-tool or the like.

Close to the side of pulley 2 there is a ring, drum, pulley, curved plate 5 or the like which is independent of or separate from the shaft 1 and is carried by a rigid arm or bracket 6 suitably fixed to a wall 7 or to a column or the like. In some instances the stationary pulley 5 may be fixed to overhead joints or to the bearings or the brackets of the shaft 1. The pulley or plate 5 is in axial alinement with pulley 2 and has either a cylindrical or a concave periphery. The adjacent edges of both pulleys 2 and 5 must have the same diameter.

Brackets or carriers 8 fixed to the wall 7 or to any other stationary part, hold two shifting rods 9 connected together by a cross-bar 10 to which is pivotally secured a reversing arm 11 operated by means of a handle 12. To the shifting rods 9 are fixed ordinary depending prongs 13 which engage the belt between them and in addition thereto they carry shifter-arms 14 which with their outer ends slide over the periphery of the stationary ring or pulley 5.

When moving the reversing arm 11 in the direction of the arrow (Fig. 2) the prongs 13 will move the belt onto the stationary ring or pulley 5 and as the latter has a smaller diameter than pulley 2, the belt will hang loose. When moving the reversing arm 11 back again to the position shown in Fig. 2, the flat ends of the shifter-arms 14 will press against the uppermost portion of the edge of the belt near the highest point of the ring, pulley, curved plate 5 or the like and so shift the loosely hanging belt bodily onto the pulley 2.

The mechanism is equally adaptable for horizontally running belts.

What I claim as my invention and desire to secure by Letters Patent is:—

A belt shifter comprising in combination with the driving pulley, a stationary member arranged on one side of said driving pulley and presenting a round surface with edges of the same diameter as and parallel to those of said pulley, guide rods arranged above said driving pulley and stationary member and adapted to be shifted transversely to said stationary member, shifting arms fixed to said guide rods and having their outer ends sliding over the circumference of said stationary member and adapted to carry the belt to said driving pulley, and
5 means for shifting said guiding rods, substantially as set forth.

In testimony whereof I have hereunto signed my name this 7th day of May 1910, in the presence of two subscribing witnesses.

ERNST HELM.

Witnesses:
   GUS LADWERDZ,
   FRAU LANGE.

Copies of this patent may be obtained for five cents each, by addressing the "Commissioner of Patents, Washington, D. C."